(12) United States Patent
Riddle

(10) Patent No.: US 10,113,654 B2
(45) Date of Patent: Oct. 30, 2018

(54) WATER DIVERTER ASSEMBLY FOR A DISHWASHING APPLIANCE

(71) Applicant: General Electric Company, Schenectady, NY (US)

(72) Inventor: Brian Steven Riddle, Taylorsville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 495 days.

(21) Appl. No.: 14/606,226

(22) Filed: Jan. 27, 2015

(65) Prior Publication Data

US 2016/0215893 A1    Jul. 28, 2016

(51) Int. Cl.
*A47L 15/42* (2006.01)
*F16K 11/056* (2006.01)
*F16K 31/20* (2006.01)

(52) U.S. Cl.
CPC ........ *F16K 11/056* (2013.01); *A47L 15/4221* (2013.01); *F16K 31/20* (2013.01)

(58) Field of Classification Search
CPC ..... F16K 11/056; F16K 31/20; A47L 15/4221
USPC .......... 134/56 D, 176, 188, 191, 57 D, 58 D, 134/184, 186, 25.2, 174
See application file for complete search history.

(56) References Cited

U.S. PATENT DOCUMENTS

| | | | | | |
|---|---|---|---|---|---|
| 2,351,342 | A | * | 6/1944 | Karlstrom | A01J 9/04 134/172 |
| 2,918,927 | A | * | 12/1959 | Clearman | A47L 15/4221 134/176 |
| 3,446,155 | A | * | 5/1969 | Guth | A47L 15/4225 417/363 |
| 3,868,835 | A | * | 3/1975 | Todd-Reeve | D06F 17/04 134/176 |
| 3,906,967 | A | * | 9/1975 | Bergeson | A47L 15/4225 134/104.4 |
| 4,004,600 | A | * | 1/1977 | Corn | A47L 15/4221 134/176 |
| 4,038,103 | A | * | 7/1977 | Grunewald | A47L 15/4202 134/10 |
| 4,060,346 | A | * | 11/1977 | Meyers | F04D 29/606 134/188 |
| 4,097,307 | A | * | 6/1978 | Geiger | A47L 15/0002 134/10 |

(Continued)

*Primary Examiner* — David G Cormier
*Assistant Examiner* — Thomas Bucci
(74) *Attorney, Agent, or Firm* — Dority & Manning, P.A.

(57) ABSTRACT

A diverter assembly for a dishwashing appliance may generally include a diverter head having a body portion and first and second outlets that form a single unitary component. In addition, the first outlet may be configured to be directly coupled to a first spray-arm assembly of the appliance and the second outlet may be configured to be directly coupled to a conduit in fluid communication with a second spray-arm assembly of the appliance. The diverter assembly may also include a valve housing configured to be coupled to the diverter head. The valve housing may define an inlet in fluid communication with a pump of the appliance and may at least partially house a diverter valve that diverts fluid received via the inlet to the first or second outlet. Moreover, the diverter assembly may be configured to be mounted directly to a bottom wall of a tub of the appliance.

20 Claims, 6 Drawing Sheets

(56) References Cited

U.S. PATENT DOCUMENTS

| | | | | |
|---|---|---|---|---|
| 4,221,547 A * | 9/1980 | Hoffman | A47L 15/4225 | 134/186 |
| 5,118,254 A * | 6/1992 | Ellingson | A47L 15/4225 | 285/362 |
| 5,165,435 A * | 11/1992 | Thies | A47L 15/23 | 134/181 |
| 5,174,318 A * | 12/1992 | Dingler | A47L 15/4246 | 134/188 |
| 5,299,586 A * | 4/1994 | Jordan | A47L 15/4225 | 134/111 |
| 5,542,443 A * | 8/1996 | Yura | A47L 15/23 | 134/176 |
| 5,630,437 A * | 5/1997 | Dries | A47L 15/4225 | 134/186 |
| 5,924,433 A * | 7/1999 | Thies | A47L 15/4246 | 134/179 |
| 6,234,184 B1 * | 5/2001 | Tuller | A47L 15/4204 | 134/104.1 |
| 6,705,330 B1 * | 3/2004 | Favret | A47L 15/4221 | 134/174 |
| 6,877,962 B2 * | 4/2005 | Turner | A47L 15/4225 | 134/174 |
| 8,778,094 B2 | 7/2014 | Blanchard et al. | | |
| 9,211,048 B2 * | 12/2015 | Bennett | A47L 15/4225 | |
| 2002/0074026 A1 * | 6/2002 | Kim | A47L 15/4208 | 134/104.1 |
| 2003/0159720 A1 * | 8/2003 | Favret | A47L 15/4221 | 134/57 D |
| 2004/0112412 A1 * | 6/2004 | Han | A47L 15/4221 | 134/58 D |
| 2004/0173249 A1 * | 9/2004 | Assmann | A47L 15/4221 | 134/94.1 |
| 2004/0200507 A1 * | 10/2004 | Williams | A47L 15/4246 | 134/25.2 |
| 2005/0268948 A1 * | 12/2005 | Jeong | A47L 15/4204 | 134/104.4 |
| 2006/0037632 A1 * | 2/2006 | Nito | A47L 15/4221 | 134/56 R |
| 2006/0054197 A1 * | 3/2006 | Yoon | A47L 15/4221 | 134/56 D |
| 2006/0249181 A1 * | 11/2006 | Wetzel | A47L 15/4221 | 134/25.1 |
| 2008/0072936 A1 * | 3/2008 | Pyo | A47L 15/4204 | 134/104.4 |
| 2008/0149148 A1 * | 6/2008 | Woo | A47L 15/4204 | 134/104.1 |
| 2008/0163903 A1 * | 7/2008 | Bang | A47L 15/421 | 134/184 |
| 2009/0133724 A1 * | 5/2009 | Shin | A47L 15/4204 | 134/104.4 |
| 2009/0266386 A1 * | 10/2009 | Haltmayer | A47L 15/4221 | 134/105 |
| 2010/0121497 A1 * | 5/2010 | Heisele | A47L 15/0049 | 700/283 |
| 2010/0139698 A1 * | 6/2010 | Gnadinger | A47L 15/23 | 134/25.2 |
| 2010/0236588 A1 * | 9/2010 | Busing | A47L 15/4221 | 134/184 |
| 2010/0269938 A1 * | 10/2010 | Busing | A47L 15/4221 | 137/887 |
| 2011/0114139 A1 * | 5/2011 | Buesing | A47L 15/4221 | 134/198 |
| 2012/0018996 A1 * | 1/2012 | Stempfle | A47L 15/4219 | 285/141.1 |
| 2012/0048313 A1 * | 3/2012 | Armstrong | A47L 15/4221 | 134/56 D |
| 2012/0097200 A1 * | 4/2012 | Fountain | A47L 15/22 | 134/56 D |
| 2012/0266924 A1 | 10/2012 | Boyer et al. | | |
| 2012/0285490 A1 * | 11/2012 | Blanchard | A47L 15/4219 | 134/25.2 |
| 2012/0285491 A1 * | 11/2012 | Blanchard | A47L 15/16 | 134/25.2 |
| 2012/0318389 A1 * | 12/2012 | Holstein | A47L 15/4221 | 137/625 |
| 2013/0000762 A1 * | 1/2013 | Buddharaju | A47L 15/4221 | 137/605 |
| 2014/0069462 A1 * | 3/2014 | Becker | A47L 15/22 | 134/10 |
| 2014/0076439 A1 * | 3/2014 | Brignone | F16K 11/072 | 137/625.47 |
| 2014/0130833 A1 * | 5/2014 | Ryu | A47L 15/18 | 134/172 |
| 2014/0182625 A1 * | 7/2014 | Lee | A47L 15/0047 | 134/18 |
| 2014/0224285 A1 * | 8/2014 | Ham | A47L 15/0047 | 134/184 |
| 2014/0261582 A1 * | 9/2014 | Koepke | A47L 15/4225 | 134/184 |
| 2015/0230687 A1 * | 8/2015 | Dries | A47L 15/4221 | 134/200 |
| 2015/0352472 A1 * | 12/2015 | Haft | H05K 999/99 | 210/459 |

\* cited by examiner

WATER DIVERTER ASSEMBLY FOR A DISHWASHING APPLIANCE

FIELD OF THE INVENTION

The present subject matter relates generally to dishwashing appliances and, more particularly, to a water diverter assembly for a dishwashing appliance.

BACKGROUND OF THE INVENTION

Dishwashing appliances generally include a tub that defines a wash chamber. Rack assemblies can be mounted within the wash chamber for receipt of articles for washing. In addition, spray-arm assemblies within the wash chamber may be used to apply or direct fluid towards the articles disposed within the rack assemblies in order to clean such articles. As is generally understood, dishwashing appliances may often include multiple spray-arm assemblies, such as a lower spray-arm assembly mounted to the tub at a bottom of the wash chamber, a mid-level spray-arm assembly mounted to one of the rack assemblies, and/or an upper spray-arm assembly mounted to the tub at a top of the wash chamber.

Moreover, dishwashing appliances are typically equipped with at least one pump for circulating fluid through the spray-arm assemblies. However, due to e.g., government regulations related to energy and/or water usage and/or due to desired operational parameters, the pump may not be configured to supply fluid to all of the spray-arm assemblies simultaneously. To address this issue, conventional dishwashing appliances typically use a device, referred to as a diverter, to control the flow of fluid within the dishwashing appliance. For example, the diverter typically incorporates a valve that is used to selectively control which spray-arm assemblies receive fluid.

Unfortunately, conventional diverters typically correspond to complex, multi-component assemblies that are often quite expensive and/or difficult to install. For instance, diverters exist that are configured to be mechanically coupled directly to the dishwasher's pump and, thus, must include complex geometries for incorporating the diverter valve and for routing the diverter through the tub. To remove components, some manufacturers have attempted to integrate portions of the diverter into the pump or the tub, such as by molding such portions directly into the pump or the tub. While such a solution may allow for a reduction in the complexity of the diverter, the integrated nature of the design increases manufacturing costs and limits the interchangeability of the diverter.

Accordingly, a simple, cost-effective diverter assembly that can be separately installed within a dishwashing appliance would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a dishwashing appliance that generally includes a tub defining a wash chamber. The tub may include a top wall, a bottom wall and sidewalls extending between the top and bottom walls. The dishwashing appliance may also include a first spray-arm assembly housed within the wash chamber, a second spray-arm assembly housed within the wash chamber, a pump configured to deliver fluid into the wash chamber and a diverter assembly in fluid communication with the pump. The diverter assembly may generally include a diverter head having a body portion and first and second outlets. The body portion and the first and second outlets may form a single unitary component. In addition, the first outlet may be configured to be directly coupled to the first spray-arm assembly and the second outlet may be configured to be directly coupled to a conduit in fluid communication with the second spray-arm assembly. The diverter assembly may also include a valve housing configured to be coupled to the diverter head. The valve housing may define an inlet in fluid communication with the pump and may at least partially house a diverter valve configured to divert the fluid received via the inlet to either the first outlet or the second outlet. Moreover, the diverter assembly may be configured to be mounted directly to the bottom wall of the tub.

In another aspect, the present subject matter is directed to a fluid circulation assembly for a dishwashing appliance. The fluid circulation assembly may generally include a first spray-arm assembly, a second spray-arm assembly, a pump configured to deliver fluid to the first and second spray-arm assemblies and a diverter assembly in fluid communication with the pump. The diverter assembly may generally include a diverter head having a body portion and first and second outlets. The body portion and the first and second outlets may form a single unitary component. Additionally, the first outlet may be configured to be directly coupled to the first spray-arm assembly and the second outlet may be configured to be directly coupled to a conduit in fluid communication with the second spray-arm assembly. The diverter assembly may also include a valve housing configured to be coupled to the diverter head. The valve housing may define an inlet in fluid communication with the pump and may at least partially house a diverter valve configured to divert the fluid received via the inlet to either the first outlet or the second outlet. Moreover, the diverter valve may comprise a ball movable within the valve housing between a first position, wherein the ball is configured to seal off the first outlet such that the fluid directed into the inlet is diverted through the second outlet, and a second position, wherein the ball is configured to seal off the second outlet such that the fluid directed into the inlet is diverted through the first outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
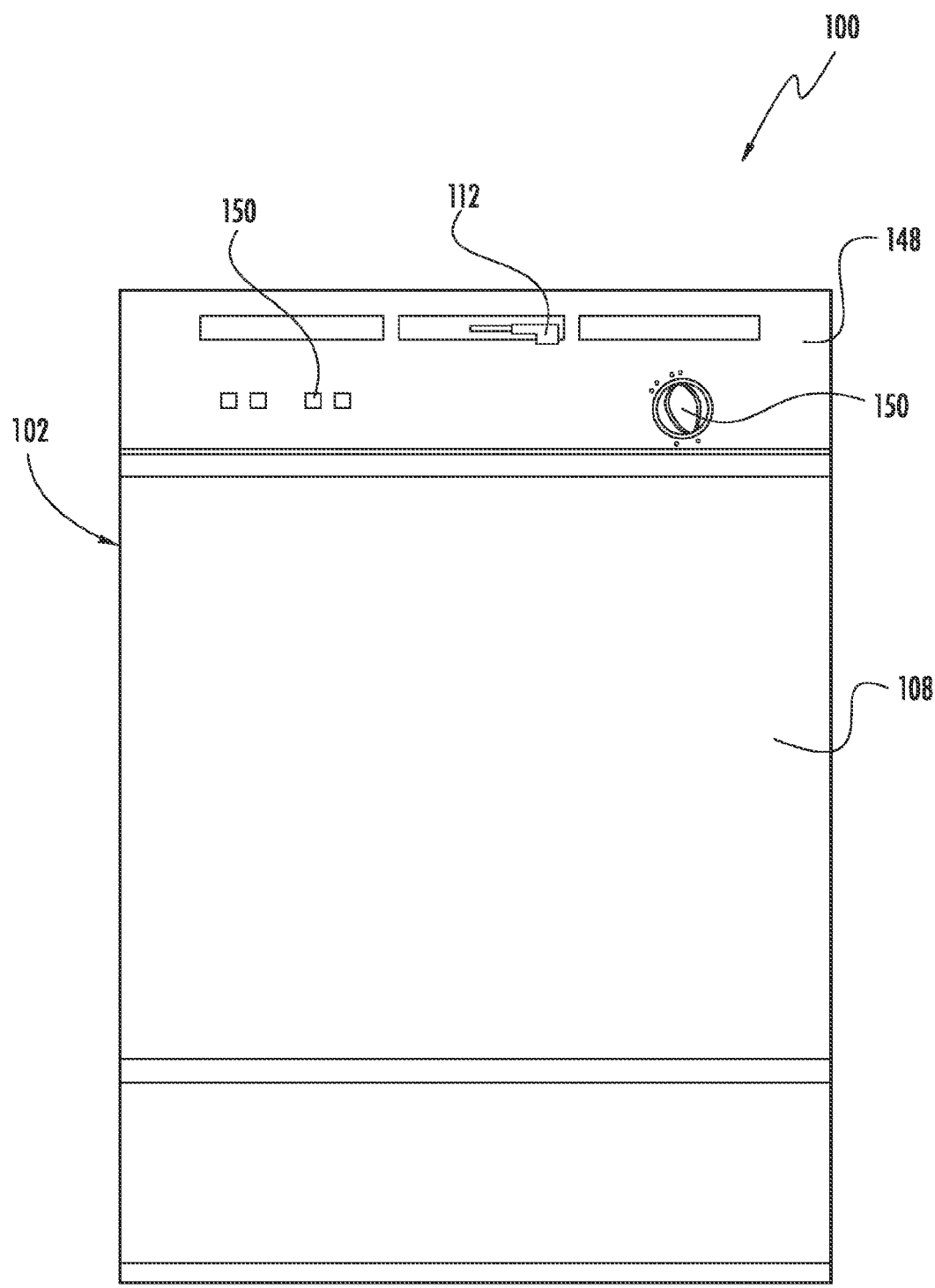
FIG. 1 illustrates a front view of one embodiment of a dishwashing appliance in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a diverter assembly for a dishwashing appliance. In several embodiments, the diverter assembly may be configured as a modular assembly that is completely separate from the pump and the tub of the dishwashing appliance. As a result, the diverter assembly may be separately installed, removed and/or replaced within the dishwashing assembly.

As will be described below, the diverter assembly may, in several embodiments, include a diverter head and a valve housing configured to be coupled to one another. The diverter head may be configured as a single, unitary component and may incorporate first and second outlets that directly interface with the lower spray-arm assembly and a conduit coupled to the remaining spray-arm assemblies of the dishwashing appliance, respectively. In addition, the diverter head may incorporate mounting features that allow the diverter assembly to be quickly and easily mounted onto the bottom wall of the dishwasher tub. Moreover, the valve housing may be configured to at least partially house a diverter valve for diverting the flow of fluid through the diverter assembly to either the first outlet or the second outlet of the diverter head.

Figure 2:
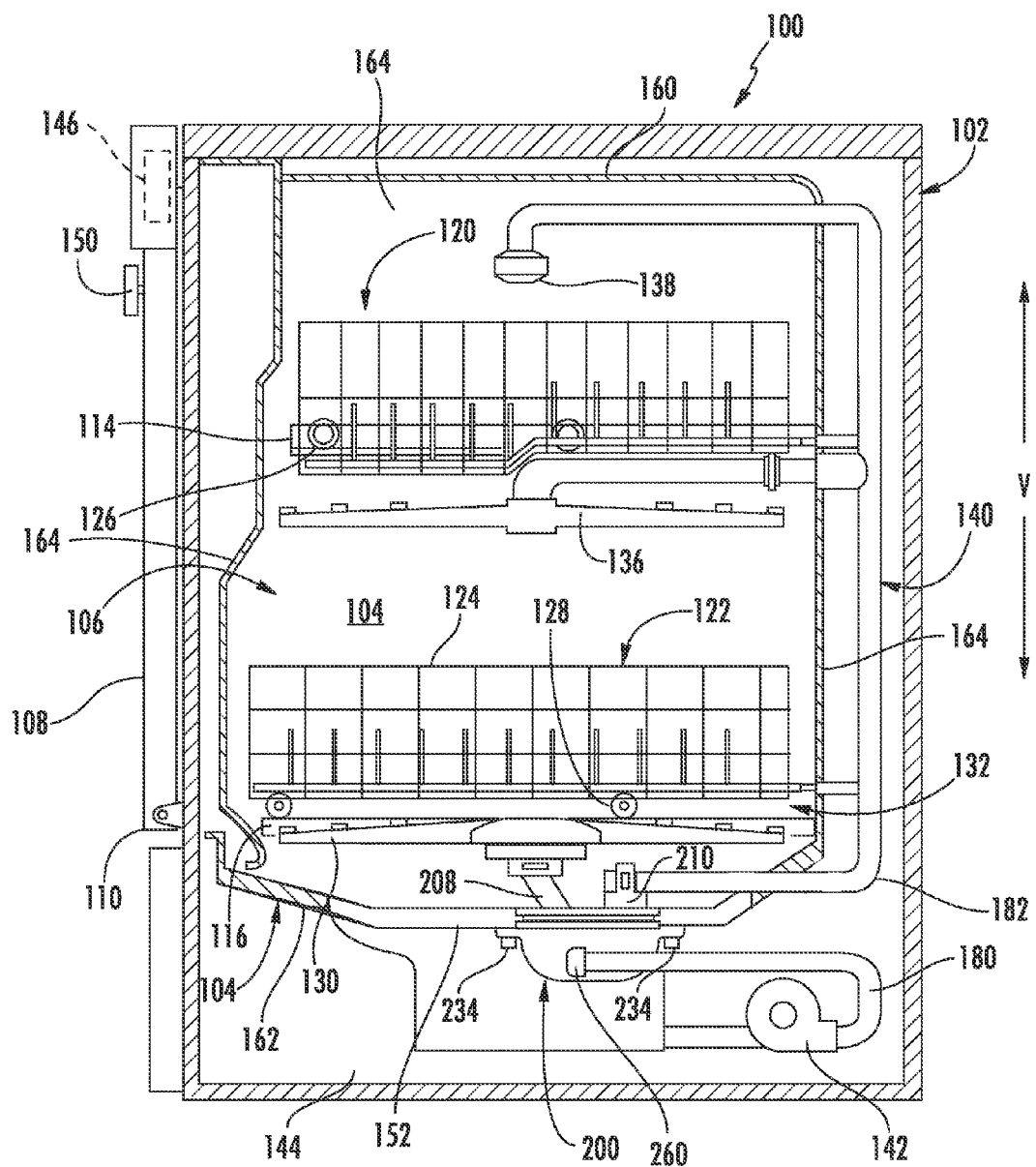
FIG. 2 illustrates a cross-sectional side view of the dishwashing appliance shown in FIG. 1, particularly illustrating various internal components of the dishwashing appliance.

Referring now to the drawings, FIGS. 1 and 2 illustrate one embodiment of a domestic dishwashing appliance 100 that may be configured in accordance with aspects of the present disclosure. As shown in FIGS. 1 and 2, the dishwashing appliance 100 may include a cabinet 102 having a tub 104 therein defining a wash chamber 106. The tub 104 may generally include a front opening (not shown) and a door 108 hinged at its bottom 110 for movement between a normally closed vertical position (shown in FIGS. 1 and 2), wherein the wash chamber 106 is sealed shut for washing operation, and a horizontal open position for loading and unloading of articles from the dishwasher. As shown in FIG. 1, a latch 112 may be used to lock and unlock the door 108 for access to the chamber 106.

As is understood, the tub 104 may generally have a rectangular cross-section defined by various wall panels or walls. For example, as shown in FIG. 2, the tub 104 may include a top wall 160 and a bottom wall 162 spaced apart from one another along a vertical direction V of the dishwashing appliance 100. Additionally, the tub 104 may include a plurality of sidewalls 164 (e.g., four sidewalls) extending between the top and bottom walls 160, 162. It should be appreciated that the tub 104 may generally be formed from any suitable material. However, in several embodiments, the tub 104 may be formed from a ferritic material, such as stainless steel, or a polymeric material.

As particularly shown in FIG. 2, upper and lower guide rails 114, 116 may be mounted on opposing side walls 164 of the tub 104 and may be configured to accommodate roller-equipped rack assemblies 120 and 122. Each of the rack assemblies 120, 122 may be fabricated into lattice structures including a plurality of elongated members 124 (for clarity of illustration, not all elongated members making up assemblies 120 and 122 are shown in FIG. 2). Additionally, each rack 120, 122 may be adapted for movement between an extended loading position (not shown) in which the rack is substantially positioned outside the wash chamber 106, and a retracted position (shown in FIGS. 1 and 2) in which the rack is located inside the wash chamber 106. This may be facilitated by rollers 126 and 128, for example, mounted onto racks 120 and 122, respectively. As is generally understood, a silverware basket (not shown) may be removably attached to rack assembly 122 for placement of silverware, utensils, and the like, that are otherwise too small to be accommodated by the racks 120, 122.

Additionally, the dishwashing appliance 100 may also include a lower spray-arm assembly 130 that is configured to be rotatably mounted within a lower region 132 of the wash chamber 106 directly above the bottom wall 162 of the tub 104 so as to rotate in relatively close proximity to the rack assembly 122. As shown in FIG. 2, a mid-level spray-arm assembly 136 may be located in an upper region of the wash chamber 106, such as by being located in close proximity to the upper rack 120. Moreover, an upper spray assembly 138 may be located above the upper rack 120.

As is generally understood, the lower and mid-level spray-arm assemblies 130, 136 and the upper spray assembly 138 may generally form part of a fluid circulation assembly 140 for circulating fluid (e.g., water and dishwasher fluid) within the tub 104. As shown in FIG. 2, the fluid circulation assembly 140 may also include a pump 142 located in a machinery compartment 144 located below the bottom wall 162 of the tub 104, as is generally recognized in the art. Additionally, each spray-arm assembly 130, 136 may include an arrangement of discharge ports or orifices for directing washing liquid onto dishes or other articles located in rack assemblies 120 and 122, which may provide a rotational force by virtue of washing fluid flowing through the discharge ports. The resultant rotation of the lower spray-arm assembly 130 provides coverage of dishes and other dishwasher contents with a washing spray.

It should be appreciated that, although the dishwashing appliance 100 will generally be described herein as including three spray assemblies 130, 136, 138, the dishwashing appliance may, in alternative embodiments, include any other number of spray assemblies, including two spray assemblies, four spray assemblies or five or more spray assemblies. For instance, in addition to the lower and mid-level spray-arm assemblies 130, 136 and the upper spray assembly 138 (or as an alternative thereto), the dishwashing appliance 100 may include one or more other spray assemblies and/or wash zones for distributing fluid within the wash chamber 106.

The dishwashing appliance 100 may be further equipped with a controller 146 configured to regulate operation of the dishwasher 100. The controller 146 may generally include one or more memory devices and one or more microprocessors, such as one or more general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 146 may be positioned in a variety of locations throughout dishwashing appliance 100. In the illustrated embodiment, the controller 146 is located within a control panel area 148 of the door 108, as shown in FIG. 1. In such an embodiment, input/output ("I/O") signals may be routed between the control system and various operational components of dishwashing appliance 100 along wiring harnesses that may be routed through the bottom 110 of the door 108. Typically, the controller 146 includes a user interface panel/controls 150 through which a user may select various operational features and modes and monitor progress of the dishwasher 100. In one embodiment, the user interface 150 may represent a general purpose I/O ("GPIO") device or functional block. Additionally, the user interface 150 may include input components, such as one or more of a variety of electrical, mechanical or electro-mechanical input devices including rotary dials, push buttons, and touch pads. The user interface 150 may also include a display component, such as a digital or analog display device designed to provide operational feedback to a user. As is generally understood, the user interface 150 may be in communication with the controller 146 via one or more signal lines or shared communication busses.

Additionally, as shown in FIG. 2, a portion of the bottom wall 162 of the tub 104 may be configured as a tub sump portion 152 that is configured to accommodate one or more components of the fluid recirculation assembly 140 (e.g., a filter assembly (not shown) and/or other components). It should be appreciated that, in several embodiments, the bottom wall 162 of the tub 104 may be formed as a single, unitary component such that the tub sump portion 152 as well as the surrounding portions of the bottom wall 162 are formed integrally with one another. Alternatively, the tub sump portion 152 may be configured as a separate component configured to be attached to the remaining portion(s) of the bottom wall 162.

Moreover, as shown in FIG. 2, the fluid recirculation assembly 140 may also include a diverter assembly 200 in fluid communication with the pump 142 for diverting fluid between one or more of the spray-arm assemblies 130, 136, 138. For example, as will be described in greater detail blow, the diverter assembly 200 may, in several embodiments, include an inlet 260 coupled to the pump 142 (e.g., via pump conduit 180 shown in FIG. 2) for directing fluid into the diverter assembly 200 and first and second outlets 208, 210 for directing the fluid received from the pump 142 to the lower spray-arm assembly 130 or the mid-level and upper spray-arm assemblies 136, 138, respectively. Specifically, in such embodiments, the first outlet 208 may be configured to be directly coupled to the lower spray-arm assembly 130 and the second outlet 210 may be configured to be coupled to a suitable fluid conduit 182 of the fluid recirculation assembly 140 for directing fluid to the mid-level and upper spray-arm assemblies 136, 138. Additionally, as will be described below, the diverter assembly 200 may also include a diverter valve 270 for diverting the flow of fluid through the assembly 200 to either the first outlet 208 or the second outlet 210.

It should be appreciated that the present subject matter is not limited to any particular style, model, or configuration of dishwashing appliance. The exemplary embodiment depicted in FIGS. 1 and 2 is simply provided for illustrative purposes only. For example, different locations may be provided for the user interface 150, different configurations may be provided for the racks 120, 122, and other differences may be applied as well.

Figure 3:
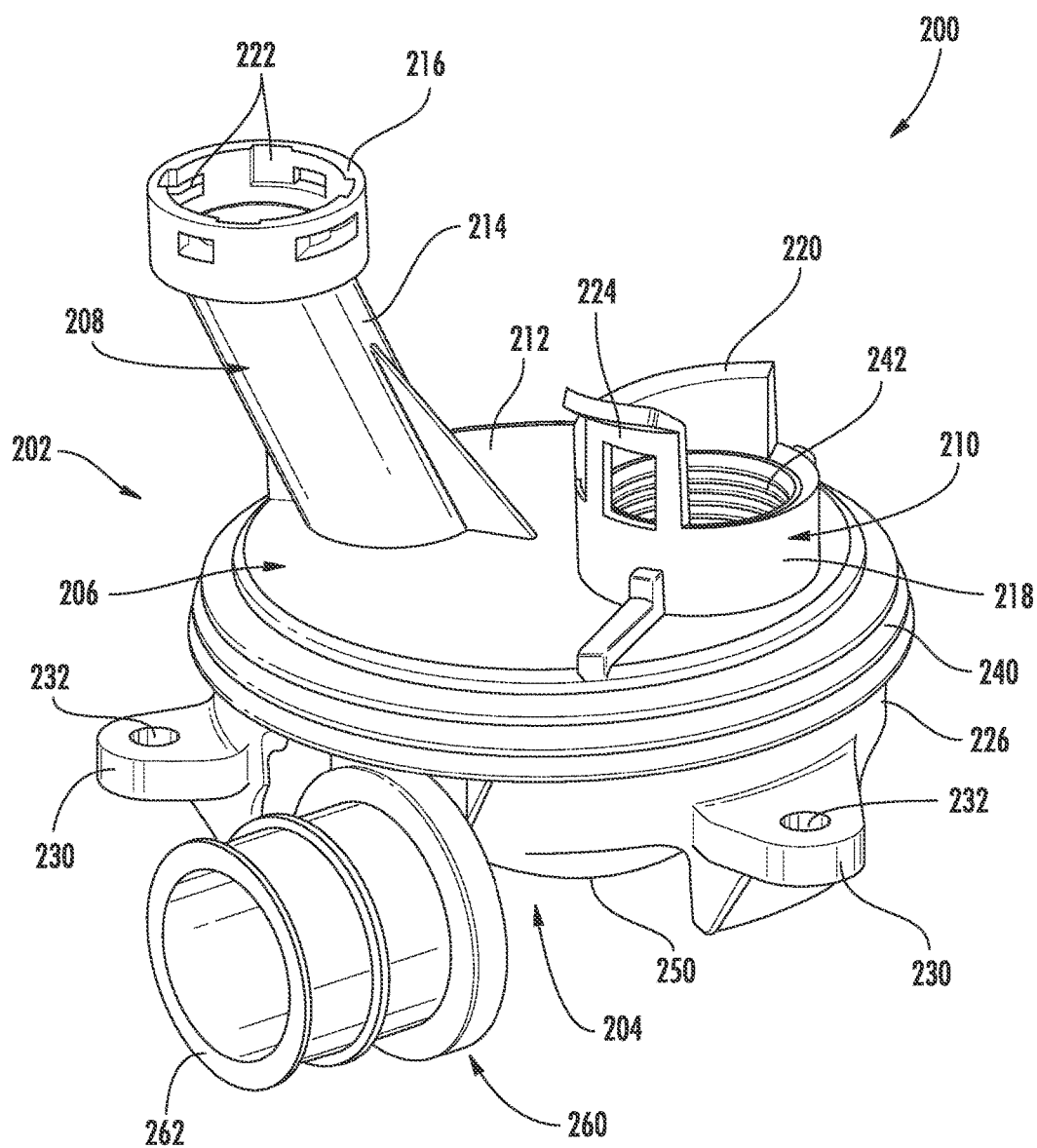
FIG. 3 illustrates a perspective view of one embodiment of a diverter assembly suitable for use within the dishwashing appliance shown in FIGS. 1 and 2.
Figure 4:
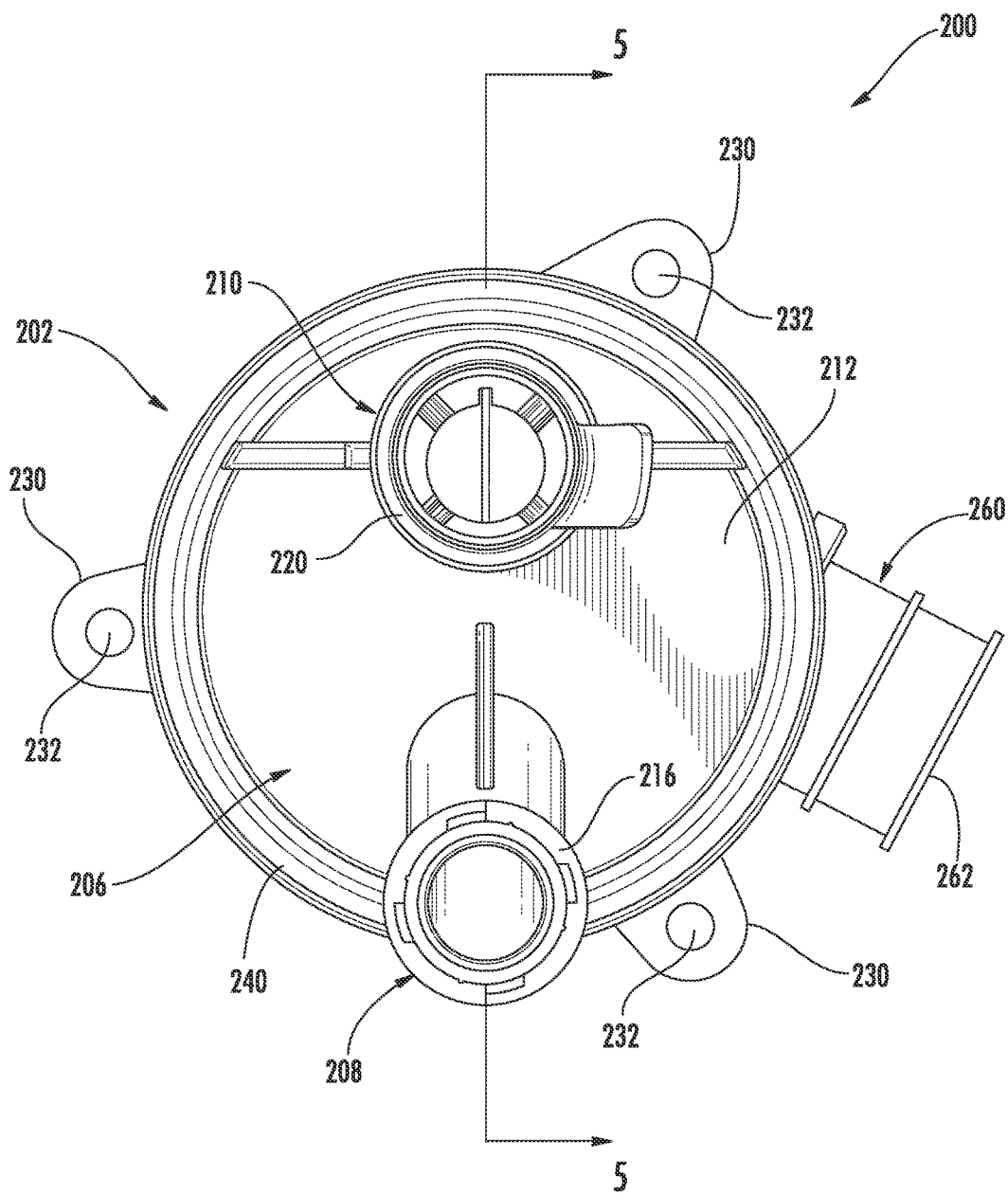
FIG. 4 illustrates a top view of the diverter assembly shown in FIG. 3.
Figure 5:
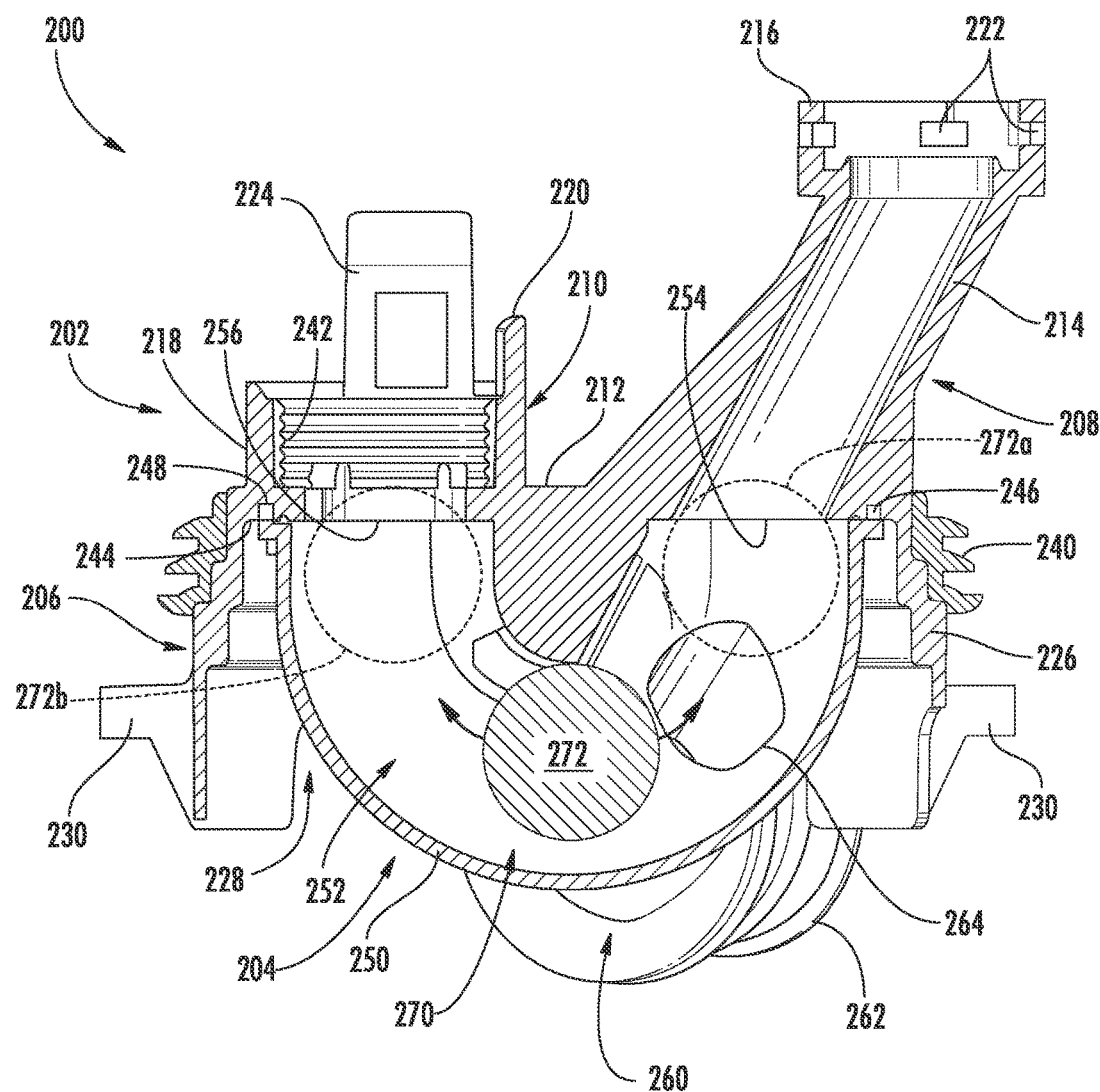
FIG. 5 illustrates a cross-sectional view of the diverter assembly shown in FIG. 3 taken about line 5-5 of FIG. 4.
Figure 6:
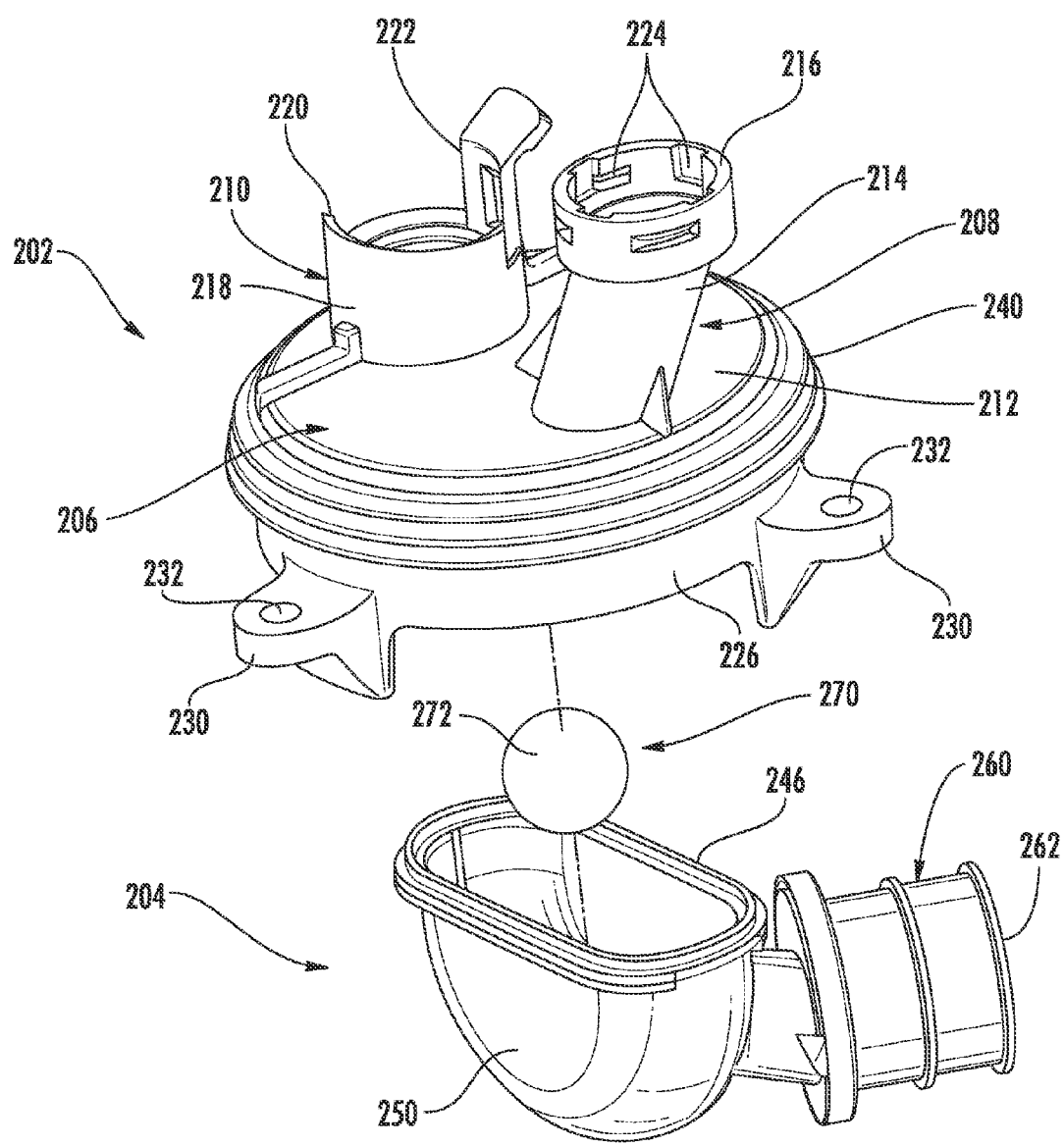
FIG. 6 illustrates a perspective, exploded view of the diverter assembly shown in FIG. 3.

Referring now to FIGS. 3-6, several views of one embodiment of the diverter assembly 200 described above are illustrated in accordance with aspects of the present subject matter. Specifically, FIG. 3 illustrates a perspective view of the diverter assembly 200 and FIG. 4 illustrates a top view of the diverter assembly 200 shown in FIG. 3. Additionally, FIG. 5 illustrates a cross-sectional view of the diverter assembly 200 shown in FIG. 3 taken about line 5-5 of FIG. 4 and FIG. 6 illustrates a perspective, exploded view of the diverter assembly 200 shown in FIG. 3.

As shown, the diverter assembly 200 may generally include a diverter head 202 and a valve housing 204 configured to be coupled to the diverter head 202. In general, the diverter head 202 may include a body portion 206 and first and second outlets 208, 210 extending outwardly from the body portion 206. In several embodiments, the diverter head 202 may be formed as a single, unitary component. For example, as shown in the illustrated embodiment, the body portion 206 and the first and second outlets 208, 210 of the diverter head 202 may be formed integrally with one another (e.g., using a 3-D printing process, a molding process and/or any other suitable process) such that the diverter head 202 forms a single unitary component.

Each outlet 208, 210 of the diverter assembly 200 may generally be formed by an outlet body extending outwardly from an upper wall 212 of the body portion 206 to an outlet end of the corresponding outlet. For example, as particularly shown in FIG. 3, the first outlet 208 may be formed by a first outlet body 214 extending from the upper wall 212 of the body portion 206 to a first outlet end 216 of the first outlet 208. Similarly, the second outlet 210 may be formed by a second outlet body 218 extending from the upper wall 212 of the body portion 206 to a second outlet end 220 of the second outlet 210.

As shown in FIG. 3, each outlet 208, 210 may also include one or more mounting features at or adjacent to its outlet end 216, 220 for facilitating coupling the outlet 208, 210 to its corresponding fluid distribution assembly component. For example, as indicated above, the first outlet 208 may be configured to be coupled directly to the lower spray-arm assembly 130 while the second outlet 210 may be configured to be coupled to the fluid conduit 182 in fluid communication with the mid-level and upper spray-arm assemblies 136, 138. Thus, as shown in FIG. 3, the first outlet 208 may include a suitable mounting feature(s) 222 formed at or adjacent to its first outlet end 216 that is configured to engage a corresponding mounting feature(s) (not shown) of the lower spray-arm assembly 130 for coupling such components together. For instance, in one embodiment, the mounting feature(s) 222 may correspond to a recessed slot(s) and/or or an opening(s) formed in the first outlet 208 that is configured to receive a corresponding projection (not shown) of the lower spray-arm assembly 130 when the diverter assembly 200 is coupled to the lower spray-arm assembly 130. Similarly, the second outlet 210 may include a suitable mounting feature(s) 224 formed at or adjacent to its second outlet end 220 that is configured to engage a corresponding mounting feature(s) (not shown) on the fluid conduit 182 for coupling such components together. For instance, the mounting feature(s) 224 may correspond to a mounting tab(s) having an opening(s) defined therein for receiving a corresponding projection (not shown) of the conduit 182 when the diverter assembly 200 is coupled to the conduit 182.

It should be appreciated that, although the diverter assembly 200 will generally be described herein as including a diverter head 202 having two outlets 208, 210, the diverter head 202 may, in alternative embodiments, include any other number of outlets, including three outlets, four outlets or five or more outlets. For instance, a third outlet (not shown) of the diverter head 202 may be configured to be in fluid communication (e.g., via a suitable conduit) with a different wash zone or spray assembly (not shown) of the dishwashing appliance 100.

Additionally, as shown in the illustrated embodiment, the body portion 206 of the diverter head 202 may generally define a circular shape formed by an annular sidewall 226 extending downwardly from upper wall 212 of the body portion 206. As a result, the annular sidewall 226, together with the upper wall 212, may generally form an open-ended cavity (FIG. 5) for receiving the valve housing 204 of the diverter assembly 200.

Moreover, the diverter head 202 may also include one or more mounting features configured for mounting the diverter assembly 200 to the bottom wall 162 of the tub 104. For example, in several embodiments, the diverter head 202 may include one or more mounting tabs 230 projecting outwardly from the annular sidewall 226 of the body portion 206. Specifically, as particularly shown in FIG. 4, the diverter head 202 may include three mounting tabs 230 extending outwardly from the annular sidewall 226, with the mounting tabs 230 being equally spaced around the circumference of the diverter head 202. However, in other embodiments, the diverter head 202 may include any other number of mounting tabs 230, such as one or two mounting tabs or four or more mounting tabs. As shown in FIGS. 3 and 4, each mounting tab 230 may include a fastener opening 232 configured to receive a suitable mechanical fastener 234 (FIG. 2), such as bolt, screw, pin, rivet and/or the like. As such, by inserting a fastener 234 through each fastener opening 232 as well as through a corresponding opening (not shown) defined in and/or through the bottom wall 12 of the tub 104, the diverter assembly 200 may be mounted to the bottom wall 162. For example, as shown in FIG. 2, the fasteners 234 may be used to couple the diverter assembly 200 to the tub sump portion 152 of the bottom wall 162.

Moreover, the diverter assembly 200 may also include a sealing device 240 for providing a seal between the diverter assembly 200 and the bottom wall 162 of the tub 104. For example, as shown in FIGS. 3 and 5, the sealing device 240 may be configured to extend around the outer perimeter of the diverter head 202 so as to cover at least a portion of the annular sidewall 226. In such an embodiment, the sealing device 240 may correspond to a separate, annular seal that is configured to be installed onto the diverter head 202 or the sealing device 240 may be configured to be formed directly onto the diverter head 202, such as by using an overmolding process to depose a polymer material or other suitable material onto the diverter head 202 to form the sealing device 240.

As shown in the cross-sectional view of FIG. 5, a secondary sealing device 242 may also be incorporated within the second outlet 210 to prevent leakage between the diverter assembly 200 and the conduit 182 during operation of the dishwashing appliance 100. For example, in one embodiment, the secondary sealing device 242 may correspond to a rubber gasket installed into and/or formed within (e.g., via an overmolding process) the second outlet 210.

Referring still to FIGS. 3-6, as indicated above, the diverter assembly 200 may also include a valve housing 204 configured to be coupled to the diverter head. For example, as shown in FIG. 5, the valve housing 204 may be configured to be inserted into the cavity 228 defined by the diverter head 202 such that the valve housing 204 may be coupled to an inner surface 244 of the top wall 212 of the diverter head 202. Specifically, as shown in the illustrated embodiment, a mounting lip 246 formed along an upper portion of the valve housing 204 may be configured to be received within a corresponding mounting recess 248 formed along the inner surface 244 of the top wall 212 of the diverter head 202 in order to couple the valve housing 204 to the diverter head 202. However, it should be appreciated that, in alternative embodiments, the valve housing 204 may be configured to be coupled to the diverter head 202 in any other suitable manner.

As shown in the illustrated embodiment, the valve housing 204 may generally include a housing body 250 configured to form a semi-circular shape. As such, when the valve housing 204 is coupled to the diverter head 202, a looped, semicircular flow path 252 (FIG. 5) may be defined between the housing body 250 and the inner surface 244 of the top wall 212 of the diverter head 202 that extends between the first and second outlets 208, 210. Specifically, as shown in FIG. 5, the looped flow path 252 may extend between a first end 254 terminating at the portion of the first outlet 208 formed through the top wall 212 of the diverter head 202 and a second end 256 terminating at the portion of the second outlet 210 formed through the top wall 212 of the diverter head 202.

Additionally, as shown in the illustrated embodiment, the valve housing 204 may include an elongated inlet 260 extending outwardly from the housing body 250. As indicated above, the inlet 260 may generally be configured to be in fluid communication with the pump 142 of the fluid circulation assembly 140 (e.g., via the pump conduit 180 shown in FIG. 2). As such, fluid discharged from the pump 142 may be directed into the diverter assembly 200 via the inlet 260 of the valve housing 204. For example, as shown in the illustrated embodiment, the elongated inlet 260 may extend between a first end 262 extending outwardly from the housing body 250 for coupling the inlet 260 to the pump 142 and a second end 264 (FIG. 5) terminating within the housing body 250. Thus, fluid received from the pump 142 at the first end 262 of the inlet 260 may be directed to the second end 264 of the inlet 260 and into the housing body 250.

In several embodiments, the valve housing 204 may be configured to at least partially house a diverter valve 270 configured to divert the fluid received within the housing body 250 via the inlet 260 to either the first outlet 208 or the second outlet 210. As shown in the illustrated embodiment, the diverter valve may, in one embodiment, correspond to a passive ball valve that diverts the flow of fluid within the housing body 250 based on the position of a valve ball 272 within the looped path 252 formed between the valve housing 204 and the diverter head 202. Specifically, as shown in FIG. 5, the ball 272 may be movable along the looped path between a first position (as shown by the dashed lines 272A), wherein the ball 272 is positioned at the first end 254 of the looped path 252 so as to seal off the first outlet 208 such that the fluid directed into the housing body 250 via the inlet 260 is diverted through the second outlet 210, and a second position (as shown by the dashed lines 272B), wherein the ball 272 is positioned at the second end 256 of the looped path 252 so as to seal off the second outlet 210 such that the fluid directed into the housing body 250 via the inlet 260 is diverted through the first outlet 208.

In such an embodiment, the ball 272 may be moved between the first and second positions due to fluid pressure exerted on the ball 272 during operation of the dishwashing appliance 100. For instance, prior to the operation of the dishwashing appliance 100, the ball 272 may be positioned at an intermediate location between the first and second ends 254, 256 of the looped path 252, such as at the position of the ball 272 shown in FIG. 5. Thereafter, when the pump 142 begins to deliver fluid to the diverter assembly 200, the pressure of the fluid flowing into the housing body 250 via the inlet 260 may force the ball upwards into its second position 272B such that it is sealed against the second outlet 210. As such, all of the fluid flowing into the diverter assembly 200 may be initially diverted to the first outlet 208 for subsequent discharge from the lower spray-arm assembly 140. Thereafter, when it is desired to divert the fluid from the pump 142 to the second outlet 210, the pump 142 may be temporarily cut-off such that the pressure build-up of the fluid contained within the conduit 182 coupled to the second outlet 210 forces the ball 272 into its first position 272A such that it is sealed against the first outlet 208. The pump 142 may then be turned on such that the pressure of the fluid flowing into the housing body 250 via the inlet 260 maintains the ball 272 sealed against the first outlet 208, thereby allowing the fluid flowing into the diverter assembly 200 to be diverted to the second outlet 210 for subsequent discharge from the mid-level and upper spray-arm assemblies 136, 138.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance, comprising:
   a tub defining a wash chamber, the tub including a top wall, a bottom wall and sidewalls extending between the top and bottom walls;
   a first spray-arm assembly housed within the wash chamber;
   a second spray-arm assembly housed within the wash chamber;
   a pump configured to deliver fluid into the wash chamber;
   a machinery compartment disposed below the bottom wall of the tub; and
   a diverter assembly in fluid communication with the pump, the diverter assembly including:
      a diverter head having a body portion and first and second outlets, the body portion and the first and second outlets forming a single unitary component, the first outlet being configured to be directly coupled to the first spray-arm assembly, the second outlet being configured to be directly coupled to a conduit in fluid communication with the second spray-arm assembly; and
      a valve housing configured to be coupled to the diverter head, the valve housing defining an inlet in fluid communication with the pump and at least partially housing a diverter valve configured to divert the fluid received via the inlet to either the first outlet or the second outlet,
   wherein the diverter assembly is mounted directly to the bottom wall of the tub, and
   wherein the diverter head further comprises at least one mounting tab projecting outwardly from the body portion for mounting the diverter assembly to the bottom wall of the tub, the at least one mounting tab abutting against an outer surface of the bottom wall when the diverter head is inserted at least partially through an opening defined through the bottom wall, the outer surface of the bottom wall facing the machinery compartment.

2. The dishwashing appliance of claim 1, wherein the first outlet is formed by an outlet body extending from the body portion to an outlet end of the first outlet, the first outlet defining at least one mounting feature at or adjacent to the outlet end for coupling the first outlet to the first spray-arm assembly.

3. The dishwashing appliance of claim 1, wherein the second outlet is formed by an outlet body extending from the body portion to an outlet end of the second outlet, the second outlet defining at least one mounting feature at or adjacent to the outlet end for coupling the second outlet to the conduit.

4. The dishwashing appliance of claim 1, wherein the at least one mounting tab defines a fastener opening for receiving a mechanical fastener for mounting the diverter assembly to the bottom wall.

5. The dishwashing appliance of claim 1, wherein the diverter valve corresponds to a passive ball valve formed within the diverter assembly between the valve housing and the diverter head.

6. The dishwashing appliance of claim 5, wherein the diverter valve comprises a ball movable within the valve housing between a first position, wherein the ball is configured to seal off the first outlet such that the fluid directed into the inlet is diverted through the second outlet, and a second position, wherein the ball is configured to seal off the second outlet such that the fluid directed into the inlet is diverted through the first outlet.

7. The dishwashing appliance of claim 6, wherein the diverter assembly defines a looped path within which the ball is positioned, the looped path extending between a first end terminating at the first outlet and a second end terminating at the second outlet.

8. The dishwashing appliance of claim 1, further comprising a sealing device extending around an outer perimeter of the diverter head, the sealing device being configured to form a seal between the diverter assembly and the bottom wall of the tub.

9. The dishwashing appliance of claim 1, further comprising a sealing device positioned within second outlet, the sealing device being configured to prevent leakage between the second outlet and the conduit.

10. The dishwashing appliance of claim 1, wherein the bottom wall of the tub comprises a tub sump portion, wherein the diverter assembly is mounted to the tub sump portion.

11. The dishwashing appliance of claim 1, wherein the first and second outlets extend outwardly from an upper wall of the body portion, the body portion further comprising an annular sidewall extending from the upper wall so as to form an open-ended cavity within the diverter head.

12. The dishwashing appliance of claim 1, wherein the first spray-arm assembly corresponds to a lower spray-arm assembly of the dishwashing appliance and the second spray-arm assembly corresponds to at least one of a mid-level spray-arm assembly or an upper spray-arm assembly of the dishwashing appliance.

13. The dishwashing appliance of claim 1, wherein the diverter head is directly mounted to the bottom wall of the tub.

14. The dishwashing appliance of claim 13, wherein, when the diverter head is mounted to the bottom wall of the tub, the first and second outlets extend through the opening defined through the bottom wall and into an interior of the wash chamber.

15. The dishwashing appliance of claim 14, wherein a sealing device extends around an outer perimeter of the diverter head, the sealing device being configured to form a seal between the outer perimeter of the diverter head and an outer perimeter of the opening defined through the bottom wall of the tub.

16. The dishwashing appliance of claim 15, wherein the at least one mounting tab projects radially outwardly from the body portion further than an outer perimeter of the diverter head.

17. The dishwashing appliance of claim 15, wherein the at least one mounting tab projects radially outwardly from the body portion further than the outer perimeter of the opening defined through the bottom wall of the tub.

18. The dishwashing appliance of claim 1, wherein the valve housing is configured to be coupled to the diverter head by a mounting lip formed along an upper portion of the valve housing, the mounting lip configured to be received within a corresponding mounting recess formed along an inner surface of a top wall of the diverter head.

19. The dishwashing appliance of claim 18, wherein the valve housing is configured to be coupled to the diverter head such that the valve housing is indirectly mounted to the bottom wall of the tub by the diverter head.

20. A dishwashing appliance, comprising:
a tub defining a wash chamber, the tub including a top wall, a bottom wall and sidewalls extending between the top and bottom walls;
a first spray-arm assembly housed within the wash chamber;
a second spray-arm assembly housed within the wash chamber;
a pump configured to deliver fluid into the wash chamber;
a machinery compartment disposed below the bottom wall of the tub; and
a diverter assembly in fluid communication with the pump, the diverter assembly including:
a diverter head having a body portion and first and second outlets, the body portion and the first and second outlets forming a single unitary component, the first outlet being configured to be directly coupled to the first spray-arm assembly, the second outlet being configured to be directly coupled to a conduit in fluid communication with the second spray-arm assembly; and
a valve housing configured to be coupled to the diverter head, the valve housing defining an inlet in fluid communication with the pump and at least partially housing a diverter valve configured to divert the fluid received via the inlet to either the first outlet or the second outlet,
wherein the valve housing is formed separately from the pump, and
wherein the body portion of the diverter head is mounted directly to the bottom wall of the tub and the valve housing is coupled to the diverter head such that the valve housing is indirectly mounted to the bottom wall of the tub.

* * * * *